3,389,201
PASTE EXTRUSION OF POLYTETRAFLUOROETHYLENE BY PREBAKING OF THE COAGULATED DISPERSION RESIN

Richard G. Alsup and Charles S. Cope, Vienna, W. Va., assignors to E. I. du Pont de Nemours and Company, Wilmington, Del., a corporation of Delaware
No Drawing. Filed July 30, 1964, Ser. No. 386,412
3 Claims. (Cl. 264—119)

ABSTRACT OF THE DISCLOSURE

Prebaking of polytetrafluoroethylene resin obtained from the coagulated aqueous dispersion thereof, at from 250 to 327° C. for 5 to 1200 minutes renders the resin more deformable; the resultant resin is especially suited to paste extrusion at reduction ratios of 10 to 200 to produce articles of increased green tensile strength.

---

The present invention relates to a process for extruding improved shaped articles of polytetrafluoroethylene resin and, more particularly, to an improved process of low reduction ratio extrusion of shaped articles of polytetrafluoroethylene resin.

It is well known that polytetrafluoroethylene resin is difficult to fabricate into various shapes by techniques applicable to most plastics. Although polytetrafluoroethylene resin has a crystalline melting point at 327° C. above which the polymer powder can be coalesced and sintered into continuous shapes, it does not become fluid and deformable asd o the usual crystalline, thermoplastic polymers above their crystalline melting point, but retains its shape and forms a fragile gel which can only be worked with difficulty. Consequently, special extrusion techniques were developed for polytetrafluoroethylene in which the powder is formed into the desired shape which subsequently is sintered and coalesced.

An improved method of forming thin extrudates has been employed by polymerizing polytetrafluoroethylene in an aqueous medium to give rise to a dispersion of polytetrafluoroethylene resin. The dispersion is coagulated, the coagulated powder is dried, and is then combined with a liquid hydrocarbon lubricant. The lubricated polymer is then passed under pressure through a die having the size and shape of the desired article under conditions such that the lubricant is not volatilized. The resulting preform is dried, the lubricant is removed, and the preform is then heated at a temperature above 327° C. to sinter the polymer into the final shape. In contrast to previously obtained polymer, the polymer obtained on coagulation of aqueous dispersions gives rise, at high and uniform rates, to an extruded, unsintered preform having great strength and toughness which can be sintered to impermeable, flawless articles. This method of extruding polytetrafluoroethylene generally called "paste extrusion" is described in greater detail in U.S. Patent 2,685,707, issued to W. E. Llewellyn and J. F. Lontz on Aug. 10, 1954.

The paste extrusion characteristics of polytetrafluoroethylene powders are related to the reduction ratio of the extrusion. This factor is the ratio of the area of the barrel of the extruder to the area of the orifice through which the paste is extruded. For some applications, such as wire coating, the orifice is small and reduction ratios are usually of a magnitude greater than 1000/1. At very high reduction ratios, the extrudate tends to fracture and thus is worthless. The development of improved forms of polytetrafluoroethylene powders allow reduction ratios of greater than 1600/1. The upper limit to the reduction ratio possible is the ability of the polymer particles to resist fracture during extrusion. On the other hand, a low reduction ratio extrusion resin is designed to be used when the orifice size is relatively large. Such reduction ratios could be on the order of 10 to 200. Such applications as tubing extrusion, beading extrusion for calendaring into tape and the like require a low reduction ratio extrusion resin. In these applications fracture is not a problem. Instead, the resin must be made of easily deformable particles. The deformed particles fibrilate in the direction of extrusion and impart a relatively high green strength to the extrudate. Such easily deformable resin powders exhibit higher than normal extrusion pressures since more particles are deformed during extrusion.

The present invention relates to the pretreatment of polytetrafluoroethylene resin to render it suitable for low reduction ratio extrusion of such preforms as tubing, beading extrusion, and the like. A resin which can be utilized with relatively high extrusion pressure will result in an extrudate having a high green strength. Such an extrudate may be readily transported and utilized without post-treatment.

The extrudates formed by paste extrusion require deformation of the individual particles in order to cause these particles to intermesh. Without this deformation and the resultant intermeshing of the particles, the extrudate would crumble and fall apart. It is thus an object of the present invention to treat polytetrafluoroethylene resin particles to render them more readily deformable.

It has now been discovered that polytetrafluoroethylene resin molding powders can be rendered suitable for low reduction ratio extrusion by subjecting the molding powders to a pretreatment. The pretreatment of polytetrafluoroethylene resin molding powders renders the particles more readily deformable and thus capable of utilizing higher than normal extrusion pressures. The pretreatment of the present invention consists of subjecting the polytetrafluoroethylene resin powder to a temperature of from about 200 to 327° C., and preferably from 250 to 320° C., for a period of from about 5 to 1200 minutes, and preferably from 30 to 360 minutes. The combination of time and temperature effects the pretreatment. At low temperatures (ca. 200° C.) longer times are required. The pretreatment cannot be satisfactorily carried out at temperatures above 327° C. since this is the sintering temperature of polytetrafluoroethylene resin and particles subjected to such a temperature would sinter. Because of economic factors it is preferred to employ a temperature of from 250 to 320° C. for a period of 30 to 360 minutes. Such conditions do not require excessively long times and do not dangerously approach the critical sintering temperature of the resin powder.

After pretreatment of the polytetrafluoroethylene resin powder has been effected, the resin powder can be admixed with a suitable lubricant and employed in low reduction ratio extrusion processes resulting in preforms having superior properties.

The present invention is further illustrated by the following examples which are intended to be merely illustrative and not limiting.

Example 1

Polytetrafluoroethylene resin powder obtained by the procedure set forth in British specification 885,809, sealed Dec. 28, 1961, was baked at 250° C. for 60 minutes and then cooled. This resin was blended with 19.2% "Varsol," a commercially available kerosene type hydrocarbon lubricant. This mixture was pressed lightly into a a preform of 1.25 inch diameter. The preform was placed in a cylinder of a paste extruder, also 1.25 inch diameter. The extruder end had a smooth matching surface with the inner cylinder surface having an angle of 165° incident to the cylinder and ending at an orifice opening of 0.125 inch. A ram was advanced into the larger opening of the cylinder at such a rate that the volume displacement within the cylinder corresponds to an extrusion rate of 19 grams of polymer per minute. The pressure required to extrude the material was recorded. The extrudate was passed through two four inch diameter, chrome-plated rolls to reduce the thickness. This operation was called "calendering." The thickness of the material was reduced successively to a thickness of 0.040 inch, 0.020 inch, 0.014 inch, 0.010 inch and 0.007 inch. The hydrocarbon lubricant was then allowed to evaporate by exposure to air. The ultimate tensile strength in p.s.i. of the unsintered tape was then determined. This data is recorded in Table I. The ultimate percent elongation was in excess of 100 percent.

TABLE I

| Baking Conditions | | Extrusion Pressure | Tape Evaluation | |
|---|---|---|---|---|
| Temperature °C. | Time, Mins. | | Thickness | Tensile Strength |
| Control | 0 | 800 | .007 | 540 |
| 250 | 60 | 1,150 | .007 | 765 |

Example 2

Polytetrafluoroethylene powders obtained by the procedure of U.S. Patent 2,750,350 were divided into two parts. One part was baked at 150° C. for 16 hours. The second was baked at 300° C. for 2 hours. Each of these materials was paste extruded and calendered as described in Example 1. The following table shows the results of the test of Example 1 upon these resins. The samples which were dried at higher temperature required the highest pressure for paste extrusion and resulted in the strongest ten mil tape.

TABLE II

| Test number: | Drying | | Paste Extrusion Pressure | 10-Mil Tape, Tensile Strength |
|---|---|---|---|---|
| | °C. | Hours | | |
| 1 | 150 | 16 | 1,150 | 620 |
| | 300 | 2 | 1,550 | 780 |
| 2 | 150 | 16 | 1,250 | 550 |
| | 300 | 2 | 2,100 | 974 |
| 3 | 150 | 16 | 1,200 | 600 |
| | 300 | 2 | 1,900 | 920 |
| 4 | 150 | 16 | 950 | 466 |
| | 300 | 2 | 1,600 | 838 |
| 5 | 150 | 16 | 1,000 | 440 |
| | 300 | 2 | 2,000 | 857 |
| 6 | 150 | 16 | 1,400 | 576 |
| | 300 | 2 | 2,500 | 1,020 |

Example 3

Samples of polytetrafluoroethylene powder prepared by the procedures set forth in U.S. Patent 2,750,350 were heated under varying conditions for varying periods of time. After heating, the polymer was cooled and paste extruded by the procedure described in Example 1. The extrudate was calendered in five steps to a seven mil tape. The data obtained showed that the higher temperature baking (300° C.) requires less time to obtain a resin capable of getting increased tensile strength.

TABLE III

| Test Number | Baking Conditions | | Extrusion Pressure | Tape Evaluation | |
|---|---|---|---|---|---|
| | Temperature, °C. | Time (Min.) | | 10-Mil, Tensile Strength | 7-Mil, Tensile Strength |
| Control | | 0 | 800-850 | 410 | 547 |
| 1 | 300 | 30 | 850-900 | 470 | 667 |
| 2 | 300 | 60 | 1,250 | 640 | 863 |
| 3 | 300 | 120 | 1,850 | 860 | 1,157 |
| 4 | 300 | 360 | 2,350 | 1,110 | 1,397 |
| 5 | 250 | 30 | 950-1,000 | 580 | 697 |
| 6 | 250 | 60 | 1,050 | 540 | 785 |
| 7 | 250 | 120 | 1,250 | 660 | 856 |
| 8 | 250 | 360 | 1,350 | 660 | 953 |
| 9 | 200 | 30 | 825-850 | 440 | 606 |
| 10 | 200 | 60 | 850 | 500 | 609 |
| 11 | 200 | 120 | 900 | 470 | 697 |
| 12 | 200 | 360 | 975 | 490 | 778 |

Example 4

The procedures of Example 3 were repeated by polytetrafluoroethylene resin powder prepared by the procedure set forth in British specification 885,809, sealed Dec. 28, 1961. The tests of Example 1 were again repeated. The results showed that the effect of baking this resin powder was similar to that described in Example 3. The results are set forth in the table below.

TABLE IV

| | Baking Conditions | | Extrusion Pressure 100/1 RR | Tape Evaluation | |
|---|---|---|---|---|---|
| | Temperature, °C. | Time (Min.) | | 10-Mil Tensile Strength | 7-Mil Tensile Strength |
| Test Number: | | | | | |
| 1 | 300 | 30 | 1,675 | 809 | 977 |
| 2 | 300 | 60 | 2,000 | 979 | 1,240 |
| 3 | 300 | 120 | 2,325 | 1,073 | 1,223 |
| 4 | 300 | 360 | 2,260 | 1,038 | 1,227 |
| 5 | 250 | 30 | 1,165 | 546 | 725 |
| 6 | 250 | 60 | 1,300 | 649 | 789 |
| 7 | 250 | 120 | 1,400 | 724 | 888 |
| 8 | 250 | 360 | 1,400 | 733 | 857 |

Example 5

Samples of polytetrafluoroethylene resin powder prepared by the procedures set forth in U.S. Patent 2,750,350 (Resin A) and the polytetrafluoroethylene resin powder prepared by the procedures set forth in British specification 885,809, sealed Dec. 28, 1961 (Resin B), were baked at 300° C., 320° C., and 340° C. for varying times. The effect of these higher temperatures was to increase the rate of change on the polymer and at temperatures where the polymer could melt, i.e., above 327° C., gave worthless extrudates. The tests of Example 1 were repeated and the results detailed in the table below.

TABLE V

| | Baking Conditions | | Extrusion Pressure (100/1) | |
|---|---|---|---|---|
| | Temperature, °C. | Time (Min.) | Resin A | Resin B |
| Test number: | | | | |
| 1 | 300 | 0 | 950 | 795 |
| 2 | | 30 | 1,675 | 1,200 |
| 3 | | 60 | 2,000 | 1,450 |
| 4 | | 120 | 2,225 | 1,725 |
| 5 | | 360 | 2,500 | 2,000 |
| 6 | | 720 | 2,500 | 2,050 |
| 7 | | 1,200 | 2,600 | 2,050 |
| 8 | 320 | 0 | 950 | 775 |
| 9 | | 30 | 2,150 | 1,450 |
| 10 | | 60 | 2,450 | 1,875 |
| 11 | | 120 | 2,600 | 2,150 |
| 12 | | 360 | 2,300 | 2,400 |
| 13 | | 720 | 2,400 | 2,375 |
| 14 | | 1,200 | 2,250 | 2,400 |

What is claimed is:

1. A process of extruding shaped articles of polytetrafluoroethylene resin powder which has been obtained from a coagulated aqueous dispersion comprising pretreating the polytetrafluoroethylene resin powder to be extruded by baking said resin powder at a temperature of from 250 to 327° C. for from 5 to 1200 minutes, whereby said resin powder is rendered more easily deformable blending the resultant treated resin powder with a lubricant, preparing a preform of the resin powder-lubricant mixture and extruding said preform into a shaped article, whereby according to said process said shaped article has improved tensile strength over that of a shaped article prepared similarly but without said baking step.

2. The process of claim 1 in which said pretreating consists of baking said resin powder at a temperature of from 250 to 320° C. for 30 to 360 minutes.

3. A process according to claim 1 wherein said preform is extruded into a shaped article at a reduction ratio in the range between 10 and 200.

References Cited

UNITED STATES PATENTS 2,456,621 12/1948 Cheney _____ 264—127
2,931,106 4/1960 Campbell _____ 34—30

FOREIGN PATENTS 154,475 12/1953 Australia.

ROBERT F. WHITE, *Primary Examiner.*

G. AUVILLE, *Assistant Examiner.*